United States Patent
Swope

[15] 3,653,384
[45] Apr. 4, 1972

[54] APPARATUS FOR DIRECTING A LIGHT BEAM

[72] Inventor: Charles Hermas Swope, Holliston, Mass.
[73] Assignee: American Optical Corporation, Southbridge, Mass.
[22] Filed: Oct. 13, 1970
[21] Appl. No.: 80,290

[52] U.S. Cl. ..................128/303.1, 331/94.5, 128/395
[51] Int. Cl. ...................................................A61b 17/36
[58] Field of Search ...............128/303.1, 395; 331/94.5

[56] References Cited

UNITED STATES PATENTS

| | | | |
|---|---|---|---|
| 3,084,694 | 4/1963 | Kavanagh et al. | 128/303.1 X |
| 3,348,547 | 10/1967 | Kavanagh | 128/395 |
| 3,528,424 | 9/1970 | Ayres | 128/303.1 |

*Primary Examiner*—L. W. Trapp
*Attorney*—William C. Nealon, Noble S. Williams, Robert J. Bird and Bernard L. Sweeney

[57] ABSTRACT

Apparatus for directing a light beam in a desired direction without moving the light source. An optical system is disclosed, including a laser and a linearly translatable optical device for directing or orienting a beam from the laser. The optical directional device includes a series of mirrors arranged to successively reflect the laser beam and further includes structure for rotating the mirrors about various axes to allow exiting of the laser beam from the last of these mirrors in a desired direction. The laser system is particularly useful in the process of photocoagulation and is useful in other medical and optical applications as well.

9 Claims, 3 Drawing Figures

Patented April 4, 1972

INVENTOR.
CHARLES HERMAS SWOPE
BY
*Robert J Bird*
ATTORNEY

Patented April 4, 1972

INVENTOR.
CHARLES HERMAS SWOPE
BY
Robert J. Bird
ATTORNEY

APPARATUS FOR DIRECTING A LIGHT BEAM

BACKGROUND OF THE INVENTION

1. Field of the Invention

The present invention relates to apparatus for directing light energy in a desired direction without moving the light source. More particularly, it relates to a photocoagulation system which utilizes a stationary laser and apparatus for translating and rotating a reflected beam from said laser which is directed from the photocoagulation system upon the surface of living tissue to cause coagulation.

2. Description of the Prior Art

In U.S. Pat. No. 3,084,694 to Kavanagh et al., entitled "Photocoagulation Apparatus," and in U.S. Pat. No. 3,348,547 to Kavanagh entitled "Photocoagulating Apparatus" (both patents being assigned to the assignee of the present invention), prior art is described. Material disclosed in these patents is incorporated herein by reference.

There are limitations in this prior art. For example, disclosed apparatus for directing a beam of light is limited in its range of exiting beam angular orientation, and other limitations will become apparent after reviewing these two patents.

Other known methods for photocoagulation incorporate a large, mobile gas-laser. A problem associated therewith (and which the present invention solves) is misalignment of the laser beam and the optical train, when the optical train is moved. The present invention describes apparatus for allowing the laser to remain motionless while readily maintaining beam alignment to the optical train as the optical train is easily moved.

Prior art further includes an optical device known as an "articulated arm." This device has been fabricated and sold by the assignee of the present invention. The articulated arm uses seven successively reflecting mirrors, arranged so that the light beam reflected from the last mirror can be pointed in some desired direction. The articulated arm is a prior art solution for maintaining a laser stationary in a photocoagulation system. However, the articulated arm is restricted in its usefulness, one of the reasons being that the arm has limited length.

Among other disadvantages of the articulated arm are the relatively large number of mirrors required which presents compounded alignment problems. Also, the arm structure itself imposes the constraint of curvilinear motion of the beam-exit aperture for certain arm positions, and this prevents perpendicular penetration of the beam into a surface for finite sideways displacements of the beam. This is a limitation in certain delicate photocoagulating operations.

The articulated arm necessarily is large and requires complex supporting structure with careful counterbalancing in order for it to work properly. The arm cannot support a heavy optical system. Furthermore, the device is difficult to fabricate and assemble, and is relatively expensive to manufacture.

The present invention is an improvement over the articulated arm and other prior art. The present invention in a preferred embodiment uses only three mirrors. The optical alignment procedure is uncomplicated. There are no gear reductions used in the apparatus of the present invention as is found in some old techniques. The translational motion of the apparatus is essentially unlimited—(limited only by the length of parallel guide rails used to guide the translational motion of the apparatus).

SUMMARY OF THE INVENTION

The present invention relates to apparatus for directing a beam of light emitted from a laser or from other appropriate light emitting devices. More specifically, the apparatus directs a light beam usually nominally collimated via a series of three mirrors that successively reflect the beam so that it exits in a desired direction. One mirror utilizes translational motion and the other two mirrors utilize rotational motions.

Each of the two rotational motions are about different axes each being parallel to, or colinear with, a reflected light beam. "Parallel" is hereby defined to include "colinear." There is a first rotation about a vertical axis and a second rotation about a horizontal axis. These two rotations in themselves allow sufficient freedom of movement to aim a light beam in almost any direction. The additional freedom of translational motion is in a direction parallel to a primary beam which emerges from a light source. It permits a linear beam movement previously unavailable in photocoagulators utilizing other reflective arrangements.

The three mirrors are so arranged in an illustrative embodiment of the present invention that the light beam reflected from any mirror makes an angle of 90° with the light beam incident to that particular mirror. A rotation of a mirror about an axis that is parallel or colinear with a light beam incident thereupon, does not disturb the aforementioned 90° angular displacement relationship between incident and reflected beam. This 90° relationship is not essential to the operation of the present invention; i.e., the relationship could be 80°, 60°, etc., or any other angle. However, 90° is selected. In a particular embodiment of the present invention, the supporting structure is made of transparent material thereby eliminating possible interference with the primary beam's incidence upon the first mirror.

Orienting means is provided for simultaneously rotating the second mirror and orbiting the third mirror about an axis parallel to the first reflected laser beam and for independently rotating the third mirror about an axis parallel to the second reflected beam. The apparatus is incorporated in a photocoagulation system wherein a rotatable fourth mirror (termed a "pantographic mirror") can be utilized to provide additional useful beam motion and to permit a physician to clearly observe his work with the beam in a photocoagulating operation.

Included among the advantages of the present invention are: weight of the system is carried by linear guide-rails allowing heavy systems to be mounted and moved without encountering large torques associated with prior art devices; distances between mirrors in a specific embodiment are variable and adjustable permitting minimization of unwanted torque or translations between mirrors; mass of optical coupling which may require movement is small—hence inertia is small and balance of the optical apparatus does not change much for movement over an entire range; and, mirrors are used in full reflection only, thereby making the apparatus wavelength independent over the visible spectrum.

The present invention is not intended to be limited to photocoagulation systems. Any application which calls for directing a beam, preferably collimated, from a stationary source into a moveable optical system would usefully incorporate the present invention.

Thus, it is an object of the present invention to provide apparatus for directing a beam of light, preferably collimated, in almost any desired direction.

It is a further object of the present invention to provide an improved photocoagulation system.

Other objects and advantages of the present invention will become apparent to one having reasonable skill in the art after referring to a detailed description of the appended drawings wherein:

BRIEF DESCRIPTION OF THE PREFERRED EMBODIMENT

Figure 1:
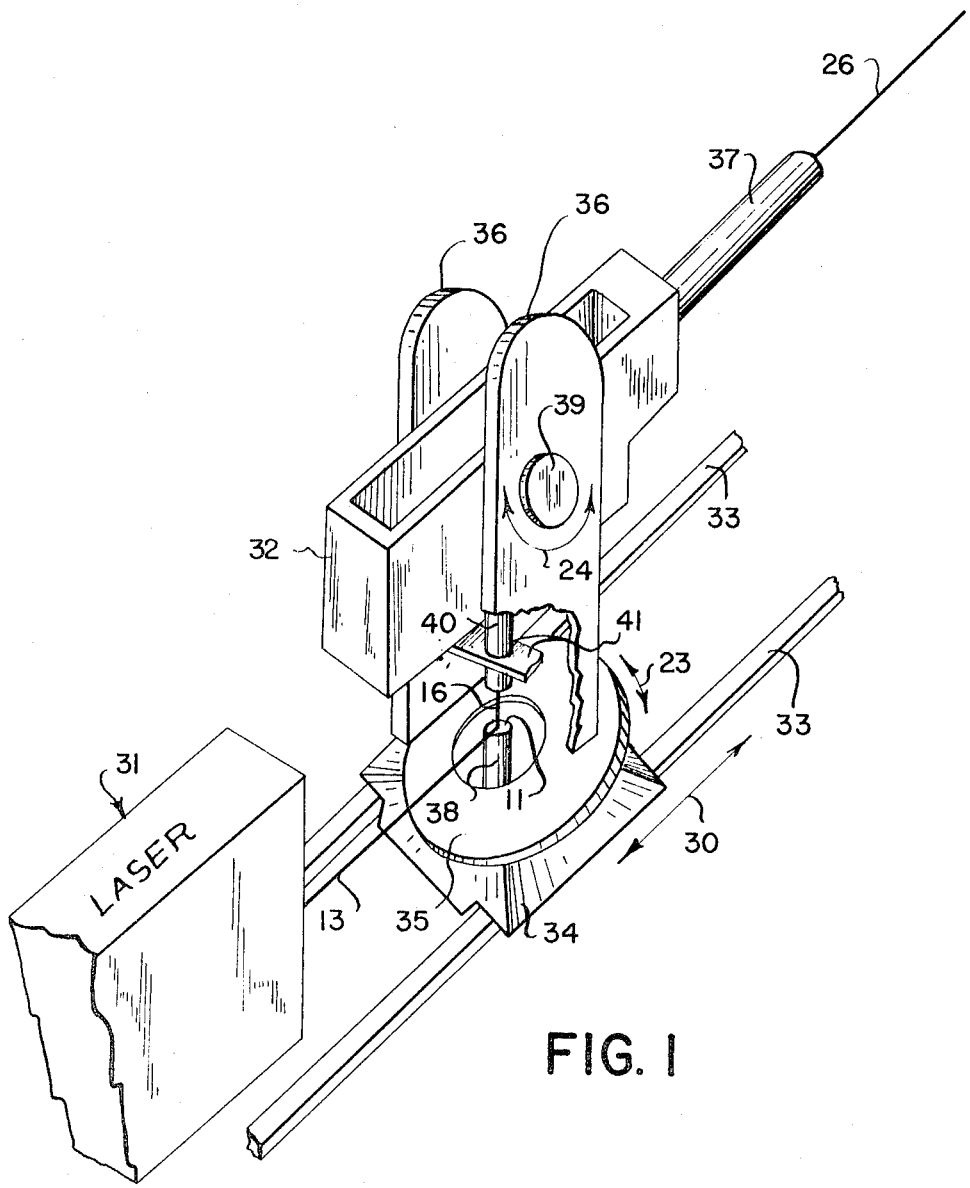
FIG. 1 is a partly broken away perspective view of a particular embodiment of the present invention, showing a primary laser beam input thereto and directionally reflected output beam therefrom. Only one of the three mirrors that are utilized, can be seen.

FIG. 1 depicts laser 31 emitting primary laser beam 13 in a direction to mirror 11. Mirror 11 is supported by cylindrical member 38 fixed to slideable base 34. Slideable base 34 is arranged to translate on guide rails 33, in directions 30 parallel to primary beam 13. First reflected beam 16 reflected from mirror 11, is directed vertically upward into (and co-axially with) hollow rod 40 and is incident upon a second mirror (not shown). Upon reflection from the second mirror and successive incidence and reflection from a third mirror (not shown) the third reflected beam passes through optical processor 37 (where it is collimated, etc.) and is emitted as third reflected beam 26.

Rotatable base 35 is arranged to rotate in directions 33 and rotates relative to slideable base 34. Constrained to rotate with rotatable base 35 are the following: vertical support members 36, pins (only one shown) 39, second and third mirrors (not shown), movable platform 32, optical processor 37, hollow rod 40, and horizontal support bar 41.

Movable platform 32 is further arranged to rotate in directions 24. Constrained to rotate with platform 32 are: pin 39, optical processor 37, and a third mirror (not shown) supported within movable platform 32.

Figure 2:
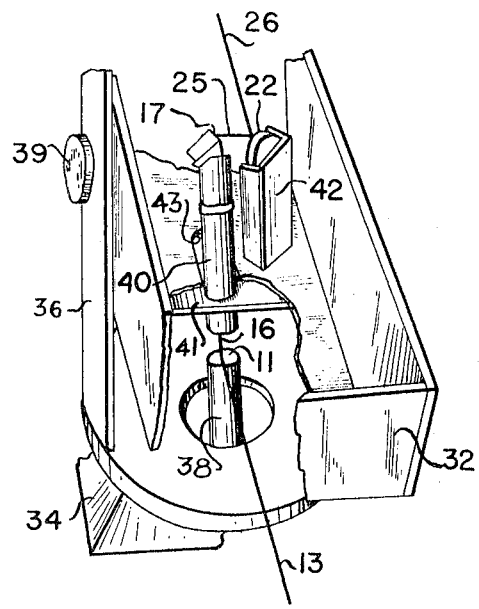
FIG. 2 is another partly broken away perspective view of a particular embodiment of the present invention showing a detailed arrangement of the three successively reflecting mirrors and their respective mounting structures; and, FIG. 3 is an optical-schematic diagram showing a particular orientation of the successive reflective arrangement of the three mirrors wherein the impinging primary beam, the first } reflected beam, the second reflected beam, and the third reflected beam all lie in the same plane. Also depicted are the 90° angular displacements between incident and reflected beams for each of the three mirrors, and the directions of motions available to the apparatus.

In FIG. 2 a second mirror 17 is supported by hollow cylindrical rod 40 and third mirror 22 is supported by mounting device 42 attached to movable platform 32 as shown. The axis of rotation of pins 39 is the axis of rotation of third mirror 22. Mounting device 42 "swings" beneath this axis. Mirrors 11, 17 and 22 are all visible in FIG. 2.

Figure 3:
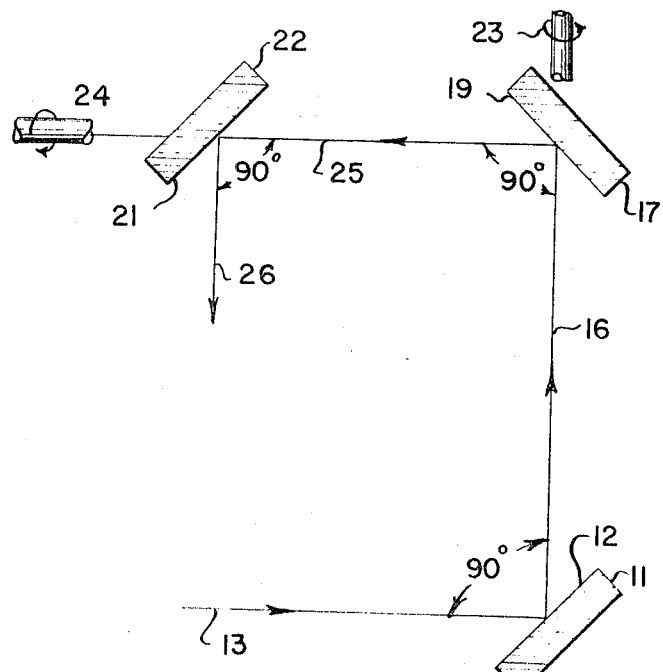

In operation one should consider FIGS. 1 and 2 in conjunction with FIG. 3 wherein mirrors 11, 17 and 22 are arranged schematically. In FIG. 3 which depicts a unique situation for purposes of clarity of illustration in which all beams lie in the same plane, primary beam 13 impinges on mirror 11 which is oriented to provide an angle of 90° at reflective surface 12 between primary beam 13 and first reflected beam 16.

First reflected beam 16 impinges upon mirror 17 which is oriented to provide a 90° displacement between first reflected beam 16 and second reflected beam 25 at reflective surface 19. Mirror 17 rotates in direction 23.

Second reflected beam 25 impinges on mirror 22 which is oriented to provide a 90° angular displacement between second reflected beam 25 and third reflected beam 26 at reflective surface 21. Mirror 22 is rotatable in direction 24. These angular displacements need not be 90° as will be explained below.

In order to aim exiting beam 26 in a desired direction, one rotates mirrors 17 and 22. If one rotates mirror 22 through an angle of 360° (in direction 24) while simultaneously maintaining mirrors 17 and 11 fixed, one provides an exiting beam 26 whose locus defines a vertical plane seen on edge in FIG. 3. (Note reference plane 50, a horizontal plane seen on edge).

By comparison, if one rotates mirror 17 in direction 23 through 360° (and thereby orbits mirror 22)—but does not rotate mirror 22 in direction 24, while maintaining mirror 11 fixed with respect thereto, the locus of exiting beam 26 defines a cylindrical surface of radius equal to the length of second reflected beam 25.

If mirrors 17 and 22 are both rotated simultaneously (but not necessarily at the same frequency) and if one could take a long exposure three dimensional photograph of exiting laser beam 26, one would observe a cylindrical hole within the laser light of radius equal to the length of second reflected beam 25. The laser light provided by motion of mirrors 17 and 22 would thus leave a cylindrical hole in the photograph wherein the laser beam does not penetrate.

However, this "hole" is filled by beam 26 for sufficient motion of mirror 11 in a linear direction. It is seen that when mirror 11 is moved through a distance equal to twice the distance of second reflected beam 25, (the diameter of the "cylindrical hole" referred to above) there is no space left "unpainted" by the exiting laser beam. Thus, the three motions allow impingement of the beam on all points in space, (for example, on all points comprising the inside surface of a room). This latter statement is true provided that the structure of the device itself does not interfere with primary laser beam 13 from impinging on mirror 11.

In order that the supporting structure of the present invention does not interfere with primary beam 13, a particular embodiment utilizes a structure made of a transparent material such as glass. Thus, no part of the supporting structure can interfere with primary beam 13 impinging on mirror 11. It is for this embodiment that exiting beam 26 can be pointed in almost any desired direction. For most supporting structures not made from transparent glass, exiting beam 26 is more limited in its angular orientation. In principle, the beam can be pointed in every direction, and is only limited by the design of the supporting structure.

An alternative embodiment suspends mirror 11 below the structure. This location of mirror 11 prevents self-interference by the structure. In this embodiment the structure need not necessarily be transparent to provide the same degree of direction-selection as with transparent material.

It should be apparent to one skilled in the art that rotating means disclosed herein need not be manually operated. For example, rotatable base 35 and pin 39 could be motor driven. They could be motor controlled to position the exiting beam at a desired angle. A similar arrangment could be used in a motor driven periscope, wherein this periscope would have an additional feature of angular elevation control, rather than only horizontal plane scanning capability. In a periscope application, the direction of light passing through the present invention would merely be reversed so that the entering beam would then be beam 26 and the exiting beam would then be beam 13.

It is to be understood that in yet another embodiment the distances between adjacent mirrors are not necessarily fixed distances, but are made variable, utilizing appropriate adjustment means.

In some applications, telescopic (translational) motions between mirrors 11 and 17 and/or mirrors 17 and 22 may be desirable. These motions are parallel to the respective reflected beams. The distances between mirrors are arbitrary and in principle, the distance between mirrors can be made as large as desirable.

In photocoagulation applications, a pantographic mirror (not shown) can be mounted on the output of optical processor 37 which further provides a 2:1 reduction in angle (an angular displacement of a mirror of 10° gives a change in beam angle of 20°). These pantographic mirrors can be partly transmissive and provide a physician with means for viewing (parallel to the exiting beam) the effect of his laser beam surgery upon the retina of a human eye or upon other body tissues.

The invention may be embodied in yet other specific forms without departing from the spirit or essential characteristics thereof. For example, many optical systems can be connected in tandem whereby a laser beam output from one system supplies the laser beam input to the next successive optical system. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A laser system of a type capable of use in a photocoagulator including a laser and linearly translatable directional means for directing a primary beam from said laser, said directional means comprising:

a supporting structure;

a series of mirrors supported by said structure, said mirrors arranged to successively reflect said beam; and, orienting means for orienting said mirrors to allow exiting of said beam from the last of said mirrors in a desired direction.

2. A system as recited in claim 1 wherein said series of mirrors further comprises:

a first mirror supported by said structure said first mirror arranged to reflect said primary beam incident thereupon providing a first reflected beam;

a second mirror supported by said structure, said second mirror arranged to reflect said first reflected beam incident thereupon, providing a second reflected beam; and a third mirror supported by said structure, said third mirror arranged to reflect said second reflected beam incident thereupon, providing a third reflected beam exiting from said system.

3. A system as recited in claim 2 wherein said orienting means comprises means for simultaneously rotating said second mirror and orbiting said third mirror about an axis parallel to said first reflected beam, and for independently rotating said third mirror about an axis parallel to said second reflected beam, whereby said exiting third beam is pointed in a desired direction.

4. A system as recited in claim 3 further including a motor wherein said orienting means is operatively connected to said motor.

5. A system as recited in claim 2 wherein said second mirror is arranged to angularly displace said second reflected beam by substantially 90° from said first reflected beam and said third mirror is arranged to angularly displace said third reflected beam by substantially 90° from said second reflected beam.

6. A system as recited in claim 2 wherein said first reflected beam is angularly displaced from said primary beam by substantially 90°.

7. A system as recited in claim 2 wherein said first mirror is displaced from said second mirror by a first selectable distance.

8. A system as recited in claim 2 wherein said first mirror is displaced from said third mirror by a second selectable distance.

9. A system as recited in claim 1 wherein said structure is made of material transparent to said primary beam.

* * * * *